3,314,998
METHOD FOR PRODUCING SALICYLALDEHYDE

Joseph Levy, Paramus, and Robert M. Lusskin, Haworth, N.J., assignors to Universal Oil Products Company, Des Plaines, Ill., a corporation of Delaware
No Drawing. Filed July 10, 1964, Ser. No. 381,924
6 Claims. (Cl. 260—600)

This application is a continuation-in-part of copending application Ser. No. 78,274, filed Dec. 27, 1960, now abandoned.

This invention relates to the production of salicylaldehyde and is directed particularly to improved methods for hydrolyzing the alpha,alpha-dichlor derivative of an ester of o-cresol to produce salicylaldehyde.

One of the most useful methods of synthesis of salicylaldehyde which has been employed in commercial production commences with o-cresol. The o-cresol is first converted to an ester such as, for example, the triphosphate by reaction with phosphorous oxychloride, or the carbonate by reaction with phosgene. In this way, the phenolic hydroxyl group is protected and the molecule is stabilized. The o-cresol ester is then submitted to chlorination whereupon the methyl side chain is substituted to form the corresponding alpha,alpha-dichlor derivative of the o-cresol ester. Hydrolysis of this chlorinated ester produces the desired salicylaldehyde and it is this step of the process to which the present invention is directed.

The hydrolysis of alpha,alpha-dichor derivatives of o-cresol esters has heretofore been carried out in a single-phase system wherein both the alpha,alhpa-dichlor derivatives of the o-cresol ester reactant and the salicylaldehyde product were both substantially soluble in the hydrolyzing medium. The hydrolysis was effected in alcohol solution by treatment with a strong alkali such as sodium hydroxide. However, this procedure utilizing a single-phase system, presents many difficulties. Thus, for example, large volumes of alcohol are required as a solvent to effect solution of the reactant and product and accordingly, the solvent must be recovered for reuse in order to operate the process economically and on a commercial basis. Furthermore, in the case of tri-(alpha,alpha-dichlor-o-cresyl) phosphate a minimum of six moles of sodium hydroxide per mole of the ester is needed to hydrolyze the chlorine atoms plus the phosphate ester linkages. Moreover, the salicylaldehyde is obtained from such alkaline procedures in the single-phase system in the form of a solution of its sodium salt so that it is necessary to acidify the solution with, for example, sulfuric acid and to extract the solution in order to recover the aldehyde. The strongly alkaline conditions employed in such methods of hydrolysis in the single-phase system also tend to reduce the yield of the desired aldehyde by promoting side reactions of the soluble products such as condensation reactions which produce tars, etc.

In accordance with the present invention, these objections and limitations inherent in the methods of the prior art are overcome and simplified procedures are provided which render the use of alkalis and the use of solvents to dissolve the reactant and product unnecessary. Moreover, salicylaldehyde is obtained directly rather than in the form of an alkali salt so that isolation of the aldehyde can be effected by simple distillation methods.

These results and advantages are attained according to this invention by hydrolyzing the alpha,alpha-dichlor derivative of o-cresol esters in a two-phase system by means of water or steam at elevated temperatures such as refluxing temperature or temperatures above the melting point of the dichlorinated-o-cresol ester.

Accordingly, the principal object of the present invention is to simplify and improve methods for the production of salicylaldehyde by hydrolysis of alpha,alpha-dichlor-o-cresol esters in a two-phase system.

A specific object of the invention is to effect such hydrolysis by means of water or steam at elevated temperatures wherein the alpha,alpha-dichlor-o-cresol esters and the salicylaldehydes are substantially insoluble in the water or steam and without resorting to the use of alkalis or solvents.

These and other objects and features of the present invention will appear from the following description thereof wherein reference is made to specific examples which are cited as typical of procedures in accordance with the present invention and for the purpose of indicating the nature of the invention rather than for the purpose of limiting the scope thereof.

In producing salicylaldehyde by the present method the alpha,alpha-dichlor-o-cresol ester may be produced in any desired manner. The phosphate ester is most readily produced and will be referred to in the following description for this reason, but it should be understood that the carbonate or other o-cresol esters may be produced and used in the form of their alpha,alpha-dichlor derivatives.

A specific advantage of utilizing the two-phase system according to this invention is that a crude chlorinated ester containing the alpha,alpha-dichlor derivative may be directly utilized in the hydrolysis. This is contrary to the prior art procedures where careful chlorination of the ester is required in order to insure that only the dichlor derivatives, which form the aldehyde, are used in the hydrolysis and that the mono- and trichlor derivatives, which form side products and ultimately condensation products such as tars, are precluded from the hydrolysis reaction.

It is quite surprising that the use of a two-phase system wherein both the ester treated and the aldehyde produced are substantially insoluble in the hydrolyzing medium is so efficient and effective compared to a one-phase system in the hydrolysis of the alpha,alpha-dichlor derivatives of an o-cresol ester in view of the fact that hydrolysis is usually more effective when the material undergoing hydrolysis is soluble in the hydrolyzing medium such as in the prior art procedures where large quantities of alcohol are utilized as the hydrolyzing medium and to solubilize the ester reactant.

The temperature at which the hydrolyzing reaction is carried out may be varied somewhat but is preferably within the range of about 100° C. to 125° C. or generally from refluxing temperature to temperatures somewhat above the melting point of the ester being hydrolyzed. Although the hydrolysis will occur at lower temperatures and down to say 80° C., it proceeds more slowly at lower temperatures so that a longer time is required to complete the reaction without any improvement in yield.

When the reaction is conducted at refluxing temperature (i.e., at about 100°–110° C.), the reaction exhibits an induction period for about the first hour during which time the initially neutral water phase gradualy becomes acidic. The hydrolysis proceeds rather slowly during this period. Thereafter the water phase becomes strongly acidic through formation of hydrogen chloride and the reaction becomes much more rapid and is usually completed in about seven to ten hours. The amount of water employed is not critical but it generally should be used in sufficient quantity to enable the reaction mixture to be stirred readily. Thus, for example, it is preferable to use about equal amounts of water and the phosphate ester. With this relative amount of water, it will be found that the water will become saturated with hydrogen chloride during the initial stages of the reaction. Thereafter, gaseous hydrogen chloride will be evolved from the reaction mixture until the hydrolysis is completed.

Salicylaldehyde is thus produced directly rather than as the sodium salt and is substantially insoluble in the hydrolyzing medium. Therefore, it can be isolated from the reaction mixture readily by steam distillation and does not require the complicated separation procedures of the prior art where the salicylaldehyde is produced as a sodium salt and is soluble in the hydrolyzing medium. Moreover, because of the two-phase system, the removal of the salicylaldehyde by distillation with steam can be accomplished during the course of the reaction as rapidly as it is formed with continuous return of the water condensate to the reaction vessel. The mixture can also be refluxed with total return of the condensate until completion of the reaction and then the aldehyde isolated by steam distillation. However, the yields are somewhat lower when the latter procedure is employed. The aldehyde is further purified by fractional distillation to give colorless product of high purity.

An alternate and even more satisfactory technique for carrying out the general process of this invention, permitted by virtue of the two-phase system, is to pass steam through the tri-(alpha,alpha-dichlor-o-cresyl) phosphate maintained at about 100°–125° C., whereby hydrolysis takes place and the liberated salicylaldehyde is also steam distilled out of the reaction mixture as rapidly as it is formed. Somewhat higher temperatures up to about 150° C. may also be used but are not necessary. The substantially insoluble aldehyde is then separated from the aqueous condensate and purified by fractional distillation. This procedure has the advantage of permitting a larger amount of phosphate ester to be hydrolyzed in a given piece of equipment.

In order to illustrate typical procedures embodying the present invention, the following examples are cited:

*Example I*

Tri-(o-cresyl) phosphate was chlorinated until about the calculated amount of chlorine necessary to produce the alpha,alpha-dichlor derivative had been adsorbed. Without separation of any of the alpha,alpha-monochlor or -trichlor derivatives produced, this crude reaction product was used directly in the hydrolysis. 1150 gms. of the crude chlorinated product were charged with about an equal amount of water in a flask fitted with a stirrer and a Bidwell type separator and condenser, and the mixture heated to reflux with vigorous stirring. Salicylaldehyde began to distill slowly shortly thereafter and was collected in the Bidwell apparatus while the aqueous condensate was continuously returned to the reaction mixture. After about two and one-half hours evolution of hydrogen chloride gas also commenced indicating that saturation of the aqueous phase with this material had occurred. The reaction was continued for about ten hours until both distillation of salicylaldehyde and evolution of hydrogen chloride ceased. A total of 507.5 gms. of steam distilled salicylaldehyde was collected, and upon fractional distillation of this material there were obtained 453 gms. colorless salicylaldehyde analyzing 99.5% pure.

*Example II*

The general procedure of Example I was followed except that the crude mixture of the tri-(alpha,alpha-dichlor-o-cresyl) phosphate and water was refluxed until evolution of hydrogen chloride ceased indicating completion of the hydrolysis. The salicylaldehyde was then removed by steam distillation and purified by fractional distillations as in Example I. The yield was about 5% lower than in Example I.

*Example III*

Tri-(alpha,alpha-dichloro-o-cresyl) phosphate was heated to about 110°–120° C. and steam then passed through the molten material with rapid stirring. Salicylaldehyde commenced distilling with the steam shortly thereafter and was obtained along with the hydrochloric acid waters upon condensation of the vapors. The introduction of steam was continued for about 10 hours until the aldehyde ceased to be evolved indicating completion of the hydrolysis. The salicylaldehyde was then separated from the aqueous condensate and purified by fractional distillation as in Example I. About the same yield of pure aldehyde was obtained.

*Example IV*

Di-(o-cresyl) carbonate is chlorinated until about the calculated amount of chlorine necessary to produce the alpha,alpha-dichlor derivative is obtained. Without separation of any of the alpha,alpha-monochlor or -trichlor derivatives, this crude reaction product is used directly in a hydrolysis according to the procedure of Example I to obtain a comparable amount of relatively pure salicylaldehyde.

In each of the foregoing examples the salicylaldehyde is produced directly as a substantially insoluble layer instead of as the alkali salt in solution so that no acidification or extraction is required. Moreover, the large amounts of solvent heretofore employed to dissolve the chlorinated ester need not be used.

It should be understood that the specific examples of the present invention which have been cited above are intended to be illustrative only and are not intended to limit the scope of the invention.

We claim as our invention:

1. The method of producing salicylaldehyde which comprises hydrolyzing an ester compound selected from the group consisting of tri-(alpha,alpha-dichlor-o-cresyl) phosphate and di-(alpha,alpha-dichlor-o-cresyl) carbonate at a temperature of from about 80° to about 150° C. in the presence of alkali-free $H_2O$ as hydrolyzing medium in which said ester compound and salicylaldehyde are substantially insoluble, whereby the hydrolysis is effected in a two-phase system.

2. The method as defined in claim 1, wherein the hydrolyzing medium is in the form of steam.

3. The method of producing salicylaldehyde which comprises hydrolyzing an ester compound selected from the group consisting of tri-(alpha,alpha-dichlor-o-cresyl) phosphate and di-(alpha,alpha-dichlor-o-cresyl) carbonate at a temperature of from about 80° to 150° C. in the presence of about an equal amount of alkali-free $H_2O$ as hydrolyzing medium in which said ester compound and salicylaldehyde are substantially insoluble, whereby the hydrolysis is effected in a two-phase system.

4. The method of producing salicylaldehyde which comprises hydrolyzing an ester compound selected from the group consisting of tri-(alpha,alpha-dichlor-o-cresyl) phosphate and di-(alpha,alpha-dichlor-o-cresyl) carbonate by heating said ester compound at refluxing temperature in the presence of alkali-free liquid $H_2O$ as hydrolyzing medium in which said ester compound and salicylaldehyde are substantially insoluble, whereby the hydrolysis is effected in a two-phase system.

5. The method of producing salicylaldehyde which comprises hydrolyzing an ester compound selected from the group consisting of tri-(alpha,alpha-dichlor-o-cresyl) phosphate and di-(alpha,alpha-dichlor-o-cresyl) carbonate by heating said ester compound to a molten state and passing a hydrolyzing medium consisting essentially of steam through the molten ester compound and separating the resulting salicylaldehyde from the distillate produced.

6. The method of producing salicylaldehyde which comprises hydrolyzing an ester compound selected from the group consisting of tri-(alpha,alpha-dichlor-o-cresyl) phosphate and di-(alpha,alpha-dichlor-o-cresyl) carbonate in the presence of about an equal amount of alkali-free liquid water by heating the mixture of said ester compound and water with refluxing to a temperature of about 100° to about 110° C. for a period of about 7 to 10 hours and thereafter steam distilling the resulting salicylaldehyde from the reaction mixture.

(References on following page)

References Cited by the Examiner

UNITED STATES PATENTS 1,023,758   4/1912   Rashing et al. _____ 260—600

OTHER REFERENCES

Wagner et al., Synthetic Organic Chemistry, John Wiley and Sons, New York, 1953, p. 285.

Groggins, Unit Processes in Organic Synthesis, 5th ed., 1958, pp. 751–753.

Houben-Weyl, "Methoden der Organischen Chemie," 1954, vol. 7/1, p. 214.

LEON ZITVER, *Primary Examiner.*

R. H. LILES, *Assistant Examiner.*